UNITED STATES PATENT OFFICE.

JOHN REICHEL, OF PHILADELPHIA, AND HENRY WERNER, OF GLEN OLDEN, PENNSYLVANIA, ASSIGNORS TO H. K. MULFORD COMPANY, OF PHILADELPHIA, PENNSYLVANIA, A CORPORATION OF PENNSYLVANIA.

PROCESS FOR PRODUCING A STERILE HOG-CHOLERA ANTITOXIN.

1,192,560.      Specification of Letters Patent.      Patented July 25, 1916.

No Drawing.      Application filed March 10, 1916. Serial No. 83,254.

*To all whom it may concern:*

Be it known that we, JOHN REICHEL, a citizen of the United States, residing in Philadelphia, in the county of Philadelphia and State of Pennsylvania, and HENRY WERNER, a subject of the King of Great Britain, residing in Glen Olden, county of Delaware, State of Pennsylvania, have invented a new and useful Improvement in Processes for Producing a Sterile Hog-Cholera Antitoxin, of which the following is a specification.

Our invention relates to processes of mechanically separating or clarifying hog cholera antitoxin (see the Dorset patent, United States, No. 823,110) to obtain a sterile product, or the process of mechanically separating or clarifying hog cholera antitoxin and filtering the liquid component obtained therefrom to produce a sterile product, of which the following is a specification.

This invention relates to the processes of mechanically separating or clarifying hog cholera antitoxin to obtain a sterile product, or to processes for mechanically separating or clarifying hog cholera antitoxin and filtering the liquid component obtained therefrom to produce a sterile product, and has for its object a new process or method for obtaining and producing mechanically a sterile product from hog cholera antitoxin.

Briefly stated, some of the advantages to be derived from the process hereinafter described in obtaining a sterile product are: A clear or completely clarified solution of the serum is obtained, or a clear solution containing the anti-bodies or immunizing or active principle is conveniently obtained, and therefore a contaminated product may be more readily recognized and be passed through filters of porcelain or infusorial earth or kieselguhr, which is advantageous because by this filtration bacteria that might cause a decomposition of the product or injury to the treated animal are removed. John Reichel, one of the inventors hereto of the process herein described invented a process of producing a sterile product from hog cholera antitoxin, briefly stated, by chemical precipitation and filtration, which is a highly useful invention, and, prior to the date of his invention, above mentioned, there was proposed, as a laboratory process, to mix hog cholera serum antitoxin with infusorial earth, put the mixture in a confining vessel, and try to force the hog cholera serum antitoxin through the earth, in order to filter the hog cholera serum antitoxin and obtain therefrom a product freed of the bacteria which were in the hog cholera serum antitoxin and which bacteria, if not removed therefrom might cause a decomposition of the product or injury to the treated animal; but such process will not allow the serum antitoxin to come through the earth as a filtering medium, substantially in any material quantity and therefore such method can not be considered or used in the commercial or manufacturing art of obtaining even a sterile serum antitoxin, which serum antitoxin constitutes only about five per cent. of the hog cholera antitoxin produced and is not generally sold or used commercially in the art; whereas, in the case of a mixture of hog cholera defibrinated blood antitoxin and infusorial earth, which antitoxin constitutes approximately ninety five per cent. of the hog cholera antitoxin sold or used in the art, the hog cholera defibrinated blood antitoxin will not pass through the infusorial earth as a filter; and, so far as we know, there was no mechanical process known to or in the art of hog cholera antitoxin for effecting the production of a sterile product from hog cholera antitoxin. Instead of depending upon the agency of a chemical precipitant, as is done in the invention by John Reichel, mentioned above, we confine the invention herein to a process of mechanical separation or clarification of hog cholera antitoxin to free the antitoxin of the bacteria which were in it or, in some cases, to separate or clarify it sufficiently to enable it to be passed through filters, specially designed therefor by use, and then through Berkefeld candles or other sterilizing filters, to free it of the bacteria which it contained and obtain a sterile product.

In carrying out our invention, we take a quantity of hog cholera antitoxin, say, in the form of liquid defibrinated blood, which, for our process, is our manufacturing raw material, and separate the same by means of a centrifugal or centrifuge tube or bowl separator machine, and we carry out the process in a tube or bowl centrifugal separation to a stage wherein there is (1) a complete clarification of the liquid, in which condition the liquid will filter through a Berkefeld candle or other sterilizing filter and a product therefrom be obtained which is freed of the bacteria which were in the hog cholera antitoxin and, therefore, a sterile product in the sense meant herein, that is to say, not regarding the fact that bacteria from the air in the place or site of carrying on or out the process may enter the product or air with bacteria in it may enter the product or (2) else the separation of the hog cholera antitoxin is not carried sufficiently far in the tube or bowl separator machine to the condition that the liquid will pass through a Berkefeld filter candle, or other sterilizing filter, but that the process is carried, however, to the point of effecting a clear liquid, substantially freed of all solid or semi-solid matter, except, however, it will not pass through a Berkefeld candle or other sterilizing filter. Upon obtaining the separated clear liquid mentioned by the use of the centrifugal tube or bowl machine separator, if it will not pass through sterilizing filters as a Berkefeld candle for example, we prepare or provide a confining vessel or one which will stand being subjected to pressure, the bottom of the vessel being foraminous or perforated or in the condition of a strainer; over the whole inner face of the bottom, we place a layer of hard filter paper, first, and on the paper a layer consisting of filter paper and ordinary cloth muslin; we then mix infusorial earth or kieselguhr, in the proportion, for example, of say, one hundred (100) grams of infusorial earth to cover the surface or area in the bottom of the vessel of, say, fifty (50) centimeters in diameter, and water, sufficient in which to suspend the earth, and which water, when drained off will leave a layer of moist earth; we then pour the mixture of earth and water in the vessel on the layer of muslin, and leave the contents of the vessel standing, for the water to drain off or, to expedite the draining off or removal of the water, the water may be forced off and out of the vessel, through the layer of muslin and paper and the bottom of the vessel; thereby leaving a layer of moist earth of substantially uniform thickness which is then covered by another layer of muslin, and which will be of the proper thickness to form a filter for the purpose of filtering the clear liquid which was discharged from the centrifugal tube or bowl machine separator, but contains enough solid or semi-solid particles to prevent the liquid from readily being passed through a sterilizing filter, say for example, a Berkefeld candle.

The above stated quantity of earth and area of surface for that filter, which for convenience we will designate, filter No. 1, may be varied, if desired, say, for example, twenty-five (25) centimeters in diameter and fifty (50) grams of earth or, in brief, for every centimeter in diameter of surface allow proportionately substantially two (2) grams of earth. Upon the muslin over the layer of moist earth, we pour the clear liquid from the centrifuge or centrifugal tube or bowl machine separator and thereupon subject the liquid to pressure, to cause the liquid to filter through the layer of earth; the latter straining or filtering out what solid or semi-solid particles it will; the layer of earth, as proportioned by us, in this step, will filter hog cholera serum antitoxin too (see the Dorset Patent, 823,110) as well as the clear liquid separated in the centrifugal tube or bowl machine separator from the hog cholera defibrinated blood or plasma antitoxin, when or if the bulk of the solid particles or semi-solid particles which were therein originally have been removed more or less, by some means or other, for example, as we have related above, by a centrifugal tube or bowl machine separator. Still having reference to our filter, No. 1, we will again describe, for sureness of understanding, and for working directions, but not as restricting our invention, that, we take, say, fifty (50) liters of the clear liquid from the centrifugal tube or bowl machine separator, pour it on our filtering surface of say, one hundred (100) grams of earth, in a layer over an area of fifty (50) centimers in diameter, prepared as above, and which for convenience, we have designated, above, filter or layer No. 1, and subject the liquid to pressure to cause it to be filtered by the layer; the filtrate from this layer, we pour on another or second layer of paper, muslin and moist earth, in another vessel, of the same density as layer No. 1, and of say, the same surface extent, but substantially of twice the thickness of layer No. 1, and after the liquid is poured on layer No. 2, as we will designate it, the liquid is forced through the layer No. 2; it should be explained that, for layer No. 2 we allow for every centimeter of diameter, substantially four (4) grams of earth; the density of earth of layers Nos. 1 and 2 being one and the same; the filtrate from the use of layer No. 2, we pour on another and separate layer, in another vessel, which layer we will call layer No. 3, and which is of the same density as the layers, Nos. 1 and 2, but of twice the thickness of layer No. 2 and four times the thickness of layer No. 1, the proportion of grams of earth to centimeters of diameter of the surface of the layer No. 3 being substantially eight (8) grams of earth to each centimeter of diameter; we pour the filtrate obtained by the use of layer No. 3, upon a fourth layer, comprised of the proportions of substantially twelve (12) grams of earth to each centimeter of diameter of layer, and the filtrate from the use of the fourth layer, we pour upon a layer composed of sixteen (16) grams of earth to each centimeter of diameter, which latter layers we will designate, layers or filters Nos. 4 and 5; it will be perceived, of course, that what we have called layers Nos. 1, 2, 3, 4 and 5, constitute separate filters, and that they are used in sequence in the numerical order in which we have designated them.

The object of passing the clear liquid discharged from the centrifugal machine separator through the separate filters, designated, Nos. 1, 2, 3, 4 and 5, is in order to remove from the clear liquid so much of or a sufficient amount of solid particles or semi-solid particles therein to enable the clear liquid to be passed through sterilizing filter, as for instance, a Berkefeld candle filter, in which case, the filtrate obtained from the Berkefeld candle is a sterile product, so far as the bacteria is concerned which was in the hog cholera antitoxin originally or in the clear liquid discharged from the centrifugal machine separator or in the filtrates obtained by the use of the separate filters heretofore designated, layers Nos. 1, 2, 3, 4 and 5. In some cases, it will be found that by the time filter or layer No. 4 has been reached and used, that the filtrate obtained therefrom will readily pass through a Berkefeld candle, and therefore, it will be unnecessary to use the filter or layer No. 5, in that particular case. It is observed also that, by preparing filters or layers similar to the filters or layers Nos. 1, 2, 3, 4, 5, but differing therefrom in progressively increasing thicknesses, as the difference in thicknesses is indicated in describing the layers Nos. 1, 2, 3, 4 and 5, and forcing the clear liquid through such additional filters, the clear liquid can be freed by the use of a complete series of such filters or layers of bacteria to the extent to be practically a sterile product.

As has been stated, above, the ultimate object and end of the process or method in question, herein described, is to obtain a sterile product, from hog cholera antitoxin; and the process described herein of effecting such a process by the use of a centrifugal tube or bowl machine separator is a commercial or manufacturing process.

As a machine means to carry out our process or separate out a sterile product from hog chlorera antitoxin, we use a centrifugal machine separator of the tube or bowl type, as we have already stated; in such a machine, the amount of centrifugal force may be varied, if and as desired; for instance, say that, we use a tube substantially of four (4) inches in diameter and rotate it at a speed of say, 20,000 revolutions per minute, the liquid discharged from the separator will be clarified, but may not be completely so, for there may remain in the liquid some solid or semi-solid particles, which, as has been said, above, will serve to prevent or retard the liquid from being passed through a sterilizing filter, say, a Berkefeld candle; if a centrifugal tube machine separator be used with a tube of, say, two inches in diameter and the tube be rotated at 40,000 or 50,000 revolutions per minute, the liquid discharged will be so well separated or clarified as that thereupon it can be passed through a Berkefeld candle or other kind of sterilizing filter, without any intermediate filtration or treatment between the clarification by the centrifugal tube machine separator and the filtration by a Berkefeld candle or other sterilizing filter; which means, of course, that the hog cholera antitoxin will be freed of its bacteria, and without resorting to the use of the filters or layers, designated Nos. 1, 2, 3, 4 and 5, first above mentioned.

We have conceived that by subjecting the hog cholera antitoxin sufficiently long under the influence of centrifugal force in the tube in the centrifugal tube machine separator and rotating the tube, say at a speed of 40,000 or 50,000 revolutions per minute, that it will be possible to obtain a liquid as discharged from the separator so completely clarified of the bacteria which were in the hog cholera antitoxin when it was placed in the separator as to be freed of those bacteria, and, so far as they were involved, the product be sterile. In the treatment of the hog cholera antitoxin by the centrifugal tube or bowl machine separator, the addition of a small quantity, comparatively, of infusorial earth to the hog cholera antitoxin, will aid in the process of the separation or clarification of the liquid.

In considering our invention herein described of obtaining a sterile product from hog cholera antitoxin and carrying out the process by using a centrifugal tube machine separator to effect our step of partially or wholly freeing the hog cholera antitoxin of its solid or semi-solid particles or components and obtain a clarified liquid, freed in some cases of the bacteria which was in the hog cholera antitoxin; in brief, to obtain by a process mechanically effected, a product which is sterile, our invention or process must not be confused with the statement of centrifugalizing fresh blood, made in the Dorset Patent, No. 823,110; the cup type of centrifugalizing machine is the only kind of centrifugalizing machine that will centrifugalize fresh blood, and therefore, that is the type of machine separator meant in the statement in the patent; but a sterile product can not be produced from fresh contaminated blood by the use of the cup type of centrifugalizing machine; and in the case of defibrinated blood, the cup type of centrifugalizing machine will not function to separate or clarify it to produce a sterile product. So that, the net effect of the statement, in question, upon us was not to help us to discover the process of producing mechanically a sterile product or disclose to us that a sterile product can be obtained mechanically from hog cholera antitoxin, but, just the contrary.

What we claim and desire to secure by Letters Patent of the United States is:—

1. In the art of obtaining a sterile product from hog cholera antitoxin, the step of subjecting the antitoxin system to centrifugal force, in sufficient amount of force and sufficiently long in amount of time, to clarify the liquid to the extent of obtaining a sterile product.

2. In the art of treating hog cholera defibrinated blood antitoxin to obtain substantially a sterile product therefrom, the step of subjecting the antitoxin system to centrifugal force of sufficient intensity and at such rate of flow of the system as to obtain a liquid substantially free of all solid particles and contaminating organisms contained therein at the beginning of such separation.

3. In the art of obtaining a sterile product from hog cholera antitoxin, the step of subjecting the antitoxin system to centrifugal force in a centrifugal tube or bowl machine separator, in a sufficient amount of force and in sufficient amount of time, to clarify the system and discharge a clear liquid, freed of the bacteria which were in the hog cholera antitoxin.

4. In the art of obtaining a sterile product from hog cholera antitoxin, the step of subjecting the antitoxin system to centrifugal force in a centrifugal tube or bowl machine separator and causing the same to separate the system to the extent that a clear liquid will be discharged, which liquid, upon filtration, can be thereupon passed through a sterilizing filter, and be renderd sterile thereby.

5. In the art of obtaining a sterile product from hog cholra antitoxin, the steps of subjecting the antitoxin system to centrifufal force in a centrifugal tube or bowl machine separator, and thereby causing the system to separate to the extent that a clear liquid is discharged from the separator, and thereupon, filtering the liquid through filters composed of a layer of moist infusorial earth, and, thereafter, passing the filtrate through a sterilizing filter or Berkefeld candle.

6. In the art of obtaining a sterile product from hog cholera antitoxin, the steps of subjecting the antitoxin system to centrifugal force in a centrifugal tube or bowl machine separator, and thereby causing the system to separate to the extent that a clear liquid is discharged from the separator, and thereupon, forcing by pressure the liquid through a filter comprised of a layer of moist infusorial earth and the filtrate through a succession of filters of moist infusorial earth of progressively increasing thicknesses.

7. In the art of obtaining a sterile product from hog cholera antitoxin, the steps of subjecting the antitoxin system to centrifugal force in a centrifugal tube or bowl machine separator, and thereby causing a system to separate to the extent that a clear liquid is discharged from the separator, and, thereafter, forcing by pressure the liquid through a filter, composed of a layer of moist infusorial earth of a thickness attained by spreading the earth to a depth of two grams of earth to every linear centimeter of surface of the layer, and the filtrate through a layer of moist infusorial earth of the same density as the layer first above mentioned, but of twice the thickness, and through successive filters of a layer of moist infusorial earth of the same density, but of thicknesses increasing in arithmetical progression.

In testimony whereof we have signed our names to this specification in the presence of two subscribing witnesses.

JOHN REICHEL.
HENRY WERNER.

Witnesses:
L. V. MASON,
R. G. JONES.